Feb. 16, 1971 MICHIO KURUSU 3,564,417

SINGLE SIDEBAND TRANSMISSION SYSTEM FOR PRODUCING A MAXIMUM AMPLITUDE SIGNAL

Filed March 11, 1968 2 Sheets-Sheet 1

Feb. 16, 1971 MICHIO KURUSU 3,564,417

SINGLE SIDEBAND TRANSMISSION SYSTEM FOR PRODUCING A MAXIMUM AMPLITUDE SIGNAL

Filed March 11, 1968 2 Sheets-Sheet 2

United States Patent Office 3,564,417

Patented Feb. 16, 1971

3,564,417

SINGLE SIDEBAND TRANSMISSION SYSTEM FOR PRODUCING A MAXIMUM AMPLITUDE SIGNAL

Michio Kurusu, Kawasaki-shi, Japan, assignor to Fujitsu Limited, Kawasaki, Japan Continuation-in-part of application Ser. No. 432,487, Feb. 15, 1965. This application Mar. 11, 1968, Ser. No. 716,692

Claims priority, application Japan, Feb. 15, 1964, 39/7,954

Int. Cl. H04b *1/68*

U.S. Cl. 325—137 5 Claims

ABSTRACT OF THE DISCLOSURE

A generator of a single sideband transmission system produces a single sideband signal substantially without a carrier. The generator supplies the single sideband signal to a linear power amplifier via a high frequency amplifier. A detector detects a portion of the envelope of the single sideband signal and produces an output signal corresponding to such envelope. The output signal of the detector is superimposed on a DC signal to provide a resultant signal having an amplitude higher by the level of the DC signal than the amplitude of the output signal. The resultant signal is applied to the power amplifier in a manner to increase the amplification of the single sideband signal for transmission in accordance with the resultant signal.

DESCRIPTION OF THE INVENTION

The present application is a continuation-in-part of my application Ser. No. 432,487, filed Feb. 15, 1965, and now abandoned for Single Sideband Transmission System For Producing a Maximum Amplitude Signal.

The present invention relates to a single sideband transmission system. More particularly, the invention relates to a single sideband transmission system providing a single sideband signal having a maximum amplitude within the operating limits of the power amplifier thereof.

The amplitude of the single sideband signal transmitted in a single sideband system is determined by the audio or voice input to the system. Thus, the amplitude of the single sideband signal transmitted varies in the same direction as the amplitude of the audio input signal; the greater the audio signal amplitude, the greater the transmitted single sideband signal amplitude. The components of the power amplifier of the single sideband system such as, for example, the vacuum tubes or transistors or the like, however, are limited in their current capacity. It is thus necessary to control or regulate the DC power supply of the power amplifier to prevent operation of said power amplifier above its current capacity.

If a class C amplifier is utilized as the power amplifier, as in known systems, the single sideband signals are passed through a limiter and are then amplified by the power amplifier. The amplified single sideband signals are then modulated in order to vary the level of the transmission signals. It is thus impossible in the known systems to instantaneously provide an output voltage or power which is as much as twice as large as that normally attainable. Furthermore, in a known system, if the frequency characteristics, especially at high frequencies, of the low frequency amplifier, for amplifying the envelope, are undesirable, there is distortion in the output. The frequency characteristics of the system deteriorate. Consequently, the positive slope or leading portion of the signal is distorted by decreasing, rather than having an abrupt and steep angle as in an ideal signal. The frequency component of the carrier wave increases due to such distortion, and a beat occurs between the carrier wave and the received signal at the receiver. If the frequency characteristics of the signal envelope transmission portion, especially the low frequency amplifier, are improved and are therefore desirable in order to avoid the foregoing difficulties, a possibility is created that the high frequency power of the single sideband signals may leak and the envelope signal amplifier characteristics may deteriorate.

The principal object of the present invention is to provide a new and improved single sideband transmission system.

An object of the present invention is to provide a single sideband transmission system which provides a single sideband signal having a maximum amplitude within the operating limits of the power amplifier thereof.

In the single sideband transmission system of the present invention, the carrier is suppressed simultaneously with the amplification of the single sideband signals through a linear amplifier and the envelope signals derived from the envelope detector are superimposed upon the DC power source of the final stage of the power amplifier so that an output voltage is provided which is theoretically a multiple, at its maximum, of the output voltage available when the envelope signals are not superimposed at all. The multiple output voltage or power is provided instantaneously and may be as much as four times as great as the output voltage or power available when the envelope signals are not superimposed. Furthermore, in the single sideband transmission system of the present invention, no limiter or class C amplifier is utilized, so that deterioration of the signals which occurs in known systems is completely eliminated in the system of the present invention. The positive slope or leading edge portions of the signals produced by the system of the present invention are at steep abrupt angles, as desired, and there is no distortion. In the system of the present invention, the peaks of the envelope signal are increased in magnitude, so that there is no particular effect due to the increasing of the signal and it is unnecessary to utilize an envelope signal amplifier having a broad band frequency characteristic.

In accordance with the present invention, the single sideband transmission system comprises a generator for producing a single sideband signal substantially without a carrier. A high frequency amplifier is provided. A linear power amplifier is connected to the output of the high frequency amplifier and includes a power supply input for controlling the amplification of the power amplifier. The power amplifier amplifies the single sideband signal for transmission. A detector detects a portion of the envelope of the single sideband signal and provides an output signal corresponding to the envelope. The single sideband signal produced by the generator is supplied to the high frequency amplifier and to the detector. The output signal of the detector is superimposed on a DC signal to provide a resultant signal having an amplitude higher by the level of the DC signal than the amplitude of the detector output signal. The resultant signal is applied to the power supply input of the power amplifier to increase the amplification of the single sideband signal for transmission in accordance with the resultant signal.

In order that the present invention may be readily carried into effect, it will now be described with reference to the accompanying drawings, wherein:

FIG. 1 is a block diagram of an embodiment of the single sideband transmission system of the present invention;

FIGS. 2*a*, 2*b*, 2*c*, 2*d*, 2*e* and 2*f* are graphical illustrations of wave forms which aid in explaining the operation of the embodiment of FIG. 1;

In the figures, the same components are identified by the same reference numerals.

Figures 1, 4:
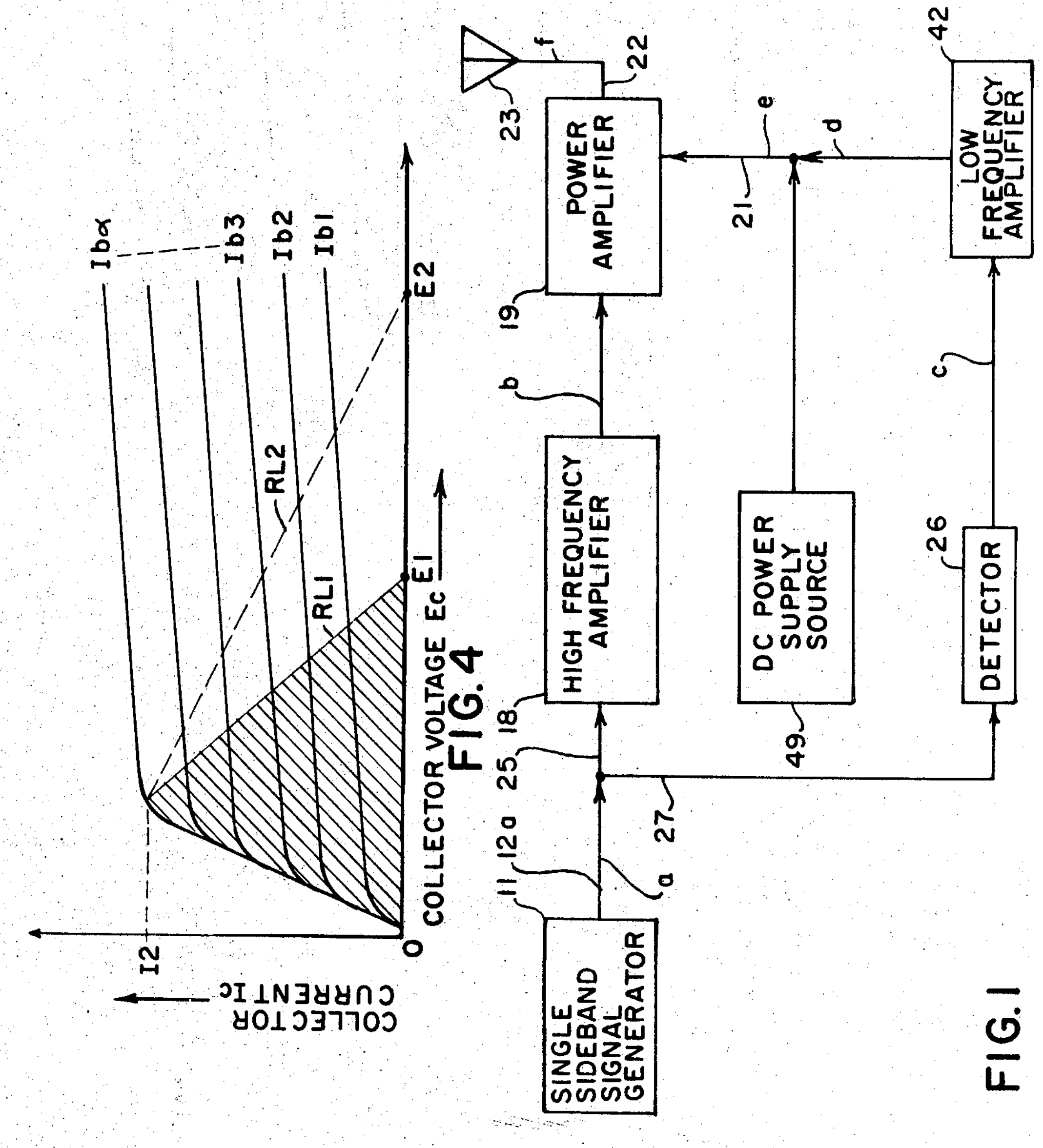
FIG. 4 is a graphical illustration of the collector current and collector voltage characteristics of transistors which may be utilized in the power amplifier of the single sideband transmission system.

In FIG. 1, a single sideband transmission system comprises a single sideband signal generator 11 which produces a single sideband signal. The single sideband signal produced by the single sideband signal generator 11 is provided at the output 12*a* of said generator. The single sideband signal generator may comprise any suitable single sideband signal generator known in the art which produces a single sideband signal of the type shown in FIG. 2*a*. A suitable generator 11 may comprise, for example, that shown in FIG. 3.

Figures 2A, 2B, 2C, 2D, 2E, 2F:
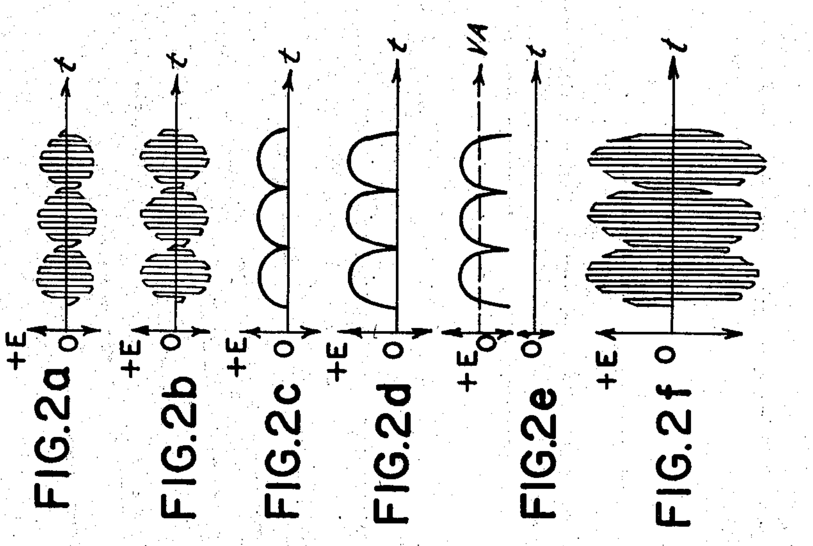
Figure 3:
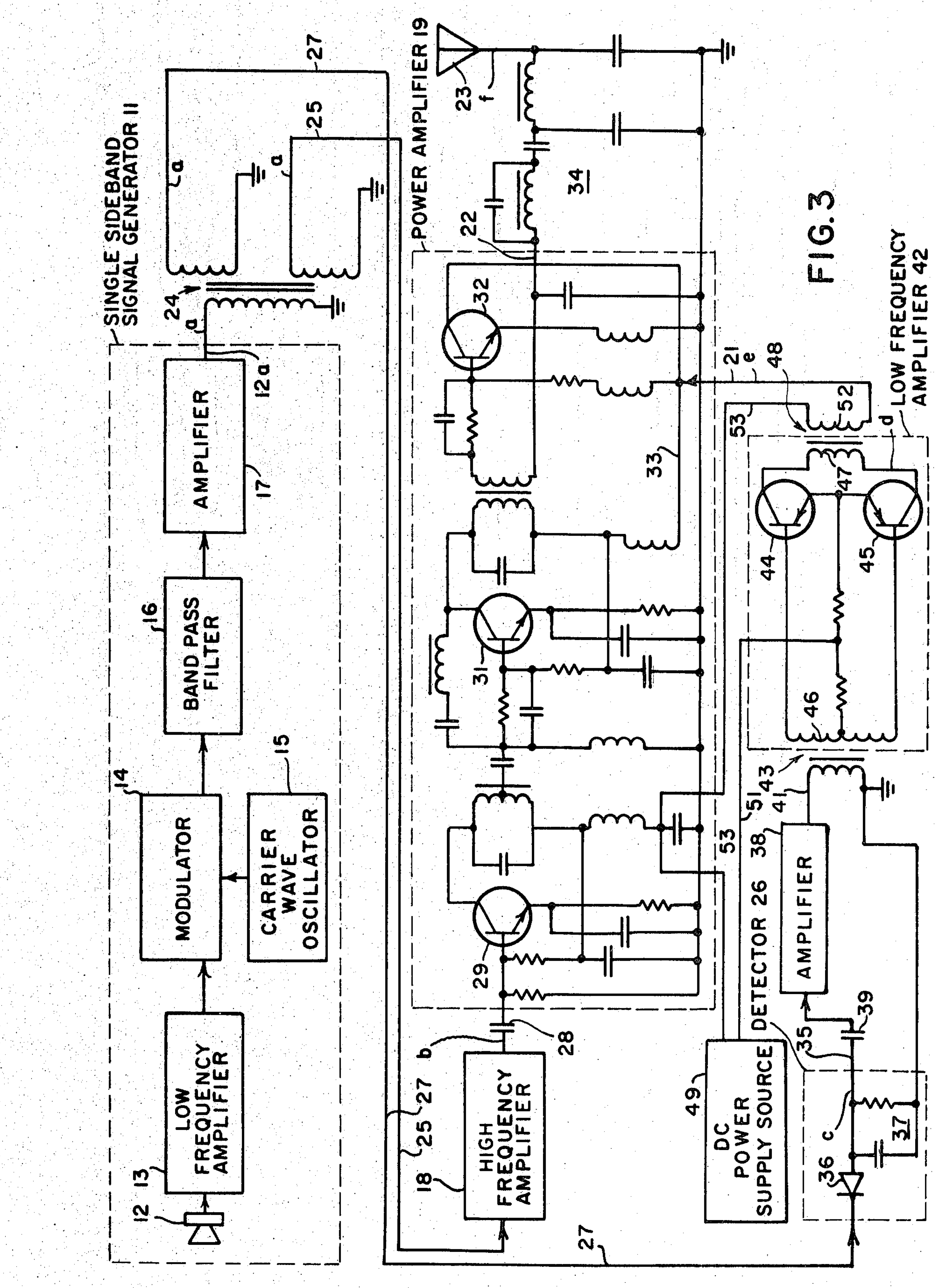
FIG. 3 is a circuit and block diagram of the embodiment of FIG. 1.

In the embodiment of FIG. 3, the single sideband signal generator 11 comprises a microphone 12 for converting the voice input to an audio electrical signal. The audio signal is fed to a low frequency amplifier 13 which amplifies it and feeds it to a modulator 14. A carrier wave oscillator 15 supplies the carrier to the modulator 14, so that the output of the modulator 14 is an audio-modulated carrier wave. The modulator 14 may comprise, for example, a ring modulator which functions to suppress any desired portion of the carrier. This assists in forming the single sideband output signal with a suppressed carrier, which output signal is therefore substantially without a carrier. The audio-modulated carrier produced by the modulator 14 is fed to a band pass filter 16 which functions to suppress either the upper or the lower sideband of the audio-modulated carrier. The single sideband signal is then amplified by an amplifier 17 and is provided at the output of the amplifier 17 as a single sideband signal as shown in FIG. 2*a*.

Each of the components of the single sideband signal generator 11 illustrated in FIG. 3 may comprise any suitable means known in the art for performing the desired and indicated function. Thus, for example, the microphone 12 may comprise any suitable microphone, the low frequency amplifier 13 may comprise any suitable low frequency amplifier, the modulator 14 may comprise any suitable modulator, the carrier wave oscillator 15 may comprise any suitable oscillator, the band pass filter 16 may comprise any suitable band pass filter, and the amplifier 17 may comprise any suitable amplifier.

A high frequency amplifier 18 (FIG. 1) has an input connected to the output of the single sideband signal generator 11 and amplifies the single sideband signal to produce a signal as shown in FIG. 2*b*. The high frequency amplifier 18 may comprise any suitable high frequency amplifier known in the art.

The amplified single sideband signal is supplied to a linear power amplifier 19 having an input connected to the output of the high frequency amplifier 18. The power amplifier 19 is a linear amplifier which generally operates as a class A or class B amplifier. This power amplifier 19 functions to further amplify the single sideband signal for transmission and comprises, besides its input connected to the output of the high frequency amplifier 18, a power supply input 21 for controlling the amplification thereof and an output 22 which provides the single sideband signal for transmission. The single sideband signal, after amplification by the power amplifier 19, may be transmitted by any suitable means such as, for example, an antenna 23. The transmitted signal is substantially without a carrier.

FIGS. 2*a*, 2*b*, 2*c*, 2*d*, 2*e* and 2*f* show a two-tone single sideband suppressed carrier signal such as, for example, a voice or audio signal.

As shown in FIG. 3, in one embodiment of the present invention, the single sideband signal produced by the single sideband signal generator 11 and illustrated in FIG. 2*a* is transmitted via a transformer 24 to the high frequency amplifier 18 via a line 25 and is also transmitted to a detector 26 via a line 27. The power amplifier 19 in the embodiment of FIG. 3 comprises a three-stage transistor circuit. The amplified single sideband signal from the high frequency amplifier 18, illustrated in FIG. 2*b*, is fed to the power amplifier 19 via a capacitor 28 which functions as a coupling capacitor.

Although, in the embodiment of FIG. 3, the transistors utilized in the power amplifier are of NPN type, it is obvious that PNP type transistors may be utilized by appropriate changes of the circuit polarities and connections, as known in the art. The first stage of the power amplifier 19 comprises a transistor 29 which is LCR coupled to a second transistor 31 of the second stage. The second transistor 31 is transformer-coupled to the third transistor 32 of the third stage. The transistor 29 of the first stage is C coupled to the high frequency amplifier 18 via the capacitor 28.

The power supply input 21 is connected to the collector electrode of the third transistor 32 via a lead 33. The output 22 of the power amplifier 19 may be coupled in any suitable manner to the antenna 23. The coupling between the power amplifier 19 and the antenna 23 may comprise an LC filter arrangement such as, for example, that shown in FIG. 3. In FIG. 3, the coupling filter 34 between the power amplifier output 22 and the antenna 23 includes a series LC filter and a series connected Pi LC filter.

The single sideband signal produced by the single sideband signal generator 11 is supplied to the detector 26 via the line 27, so that the single sideband signal illustrated in FIG. 2*a* is fed to each of the high frequency amplifier 18 and the detector 26. The line 27 serves as the input to the detector 26. The detector 26 may comprise any suitable arrangement for detecting a portion of the envelope of the single sideband signal produced by the single sideband signal generator 11 and providing at its output 35 an output signal, as illustrated in FIG. 2*c*, corresponding to said envelope. In the embodiment of FIG. 3, the detector 26 comprises a diode 36 connected directly in the line between the input and the output of said detector, and an RC filter 37 connected between said line and ground.

The output signal of the detector 26, provided in its output 35, is C coupled to an amplifier 38 via a capacitor 39. The amplifier 38 may comprise any suitable amplifier known in the art.

The amplifier 38 functions to amplify the output signal of the detector. The amplified output signal of the detector 26, provided at the output 41 of the amplifier 38, is transmitted to a low frequency amplifier 42 which is transformer-coupled to the output of said amplifier 38. The transformer coupling between the amplifier 38 and the low frequency amplifier 42 is accomplished by a transformer 43 of any suitable configuration.

The low frequency amplifier 42 may comprise, for example, any suitable low frequency amplifier known in the art. In the embodiment of FIG. 3, the low frequency amplifier 42 comprises first and second PNP type transistors 44 and 45, respectively, connected in push-pull relation with their emitter electrodes directly connected to each other, with their base electrodes connected to each other through the secondary winding 46 of the transformer 43 and with their collector electrodes connected to each other through the primary winding 47 of a transformer 48. The transistors 44 and 45 may, of course, comprise NPN type transistors if the appropriate circuit changes are made.

The low frequency amplifier 42 functions to further amplify the output signal of the detector 26. Thus, an amplified signal as illustrated in FIG. 2*d* is provided at the output of the low frequency amplifier 42, which output is the primary winding 47 of the transformer 48. The low frequency amplifier 42 has a frequency characteristic of 30 cycles per second to several tens of thousands of cycles per second.

A DC power supply source 49 may comprise any suitable source of DC. The DC power supply source 49 provides a DC voltage which is applied to the low frequency amplifier 42 to provide the necessary biasing voltage via a line 51. The DC voltage from the DC power supply source 49 is applied to the secondary winding 52 of the transformer 48 via a line 53.

Thus, the secondary winding 52 of the transformer 48 has both the DC voltage from the DC power supply source 49 and the amplified output signal of the detector 26 applied to it and functions to combine the voltage and the signal by superimposing said amplified output signal on said DC voltage or signal. The superimposing of the amplified output signal of the detector 26 on the DC signal from the DC power supply source 49 provides a resultant signal, as illustrated in FIG. 2*e*, having an amplitude higher by the level of the DC signal than the amplitude of said amplified output signal.

The resultant signal provided by the secondary winding 52 of the transformer 48 is applied to the power supply input 21 of the power amplifier 19 and increases the amplification of the single sideband signal for transmission in accordance with said resultant signal. The resultant signal, illustrated in FIG. 2*e*, is supplied to the collector electrode of the third transistor 32 of the power amplifier 19 via the lead 33 and modulates the collector signal of said transistor to provide the single sideband signal for transmission illustrated in FIG. 2*f*. The signal illustrated in FIG. 2*f* is then transmitted via the antenna 23.

The DC level of the DC signal of the resultant signal supplied to the power amplifier 19, as illustrated in FIG. 2*e*, is constant if it is averaged as shown in FIG. 2*e* by VA. If the level or amplitude of the average DC signal VA is kept just below the operating limit or maximum permissible DC level of the power amplifier 19, the single sideband signal transmitted via the antenna 23 has a maximum amplitude within the operating limits of said power amplifier. This is so, even when the voice input at the microphone 12 of the single sideband signal generator 11 is at a maximum intensity and amplitude and the high frequency output of the system reaches a maximum amplitude which may even reach several times the normal level or amplitude. The average level of the DC power supply signal to the power amplifier 19 remains below the operating limit or maximum permissible level, and the peaks of the single sideband signal are transmitted at a maximum amplitude with efficiency and within the prescribed operating limits.

FIG. 4 illustrates the collector current and collector voltage characteristics of transistors which may be utilized in the power amplifier 19 of the single sideband signal transmission system of the present invention. The purpose of FIG. 4 is to illustrate that although the transistors utilized in the power amplifier 19 may perchance have unsuitable or undesirable current characteristics, the amplitude of the single sideband signal provided by said power amplifier may still be a maximum. Thus, in FIG. 4, the abscissa indicates the collector voltage $E_c$ and the ordinate represents the collector current $I_c$. The collector current-voltage characteristics shown in FIG. 4 are for different values of base current $I_{b1}$, $I_{b2}$, $I_{b3}$ to infinity.

Thus, when the collector voltage has a value E1 and normal constant voltage bias, the high frequency maximum output of the power amplifier is indicated by the cross-hatched portion of the curves of FIG. 4. The load line RL1 for such a circumstance is indicated by a full line. However, when the collector voltage has a value E2, as in the present invention, the load line is indicated by broken lines RL2. The power output of the power amplifier 19 is then E2·I2 and the maximum amplitude of the output signal of said power amplifier may be as much as four times that when the present invention is not utilized.

The system of the present invention permits the transformer coupling, via the transformer 48, of the low frequency amplifier 42 and the power amplifier 19, and such coupling is advantageous. The output signal of the detector 26 may be controlled or restricted to provide a desired level for the average DC voltage VA, as illustrated in FIG. 2*e*, if the collector electrode output of the third transistor 32 of the power amplifier 19 is to be modulated or influenced one-hundred percent by the resultant signal supplied thereto via the power supply input 21 of said power amplifier.

While the invention has been described by means of specific examples and in a specific embodiment, I do not wish to be limited thereto, for obvious modifications will occur to those skilled in the art without departing from the spirit and scope of the invention.

I claim:

1. A single sideband transmission system, comprising:

generating means having an output for producing a single sideband signal substantially without a carrier;

linear amplifying means having an input, an amplification control input and an output for amplifying a single sideband signal for transmission;

detecting means having an input and an output for detecting a portion of the envelope of the single sideband signal and providing at its output an output signal corresponding to said envelope;

means connecting the output of said generating means to the input of said linear amplifying means and to the input of said detecting means;

DC power supply means coupled to the output of said detecting means for adding a signal to the output signal of said detecting means to increase the amplitude of said output signal to provide a resultant signal; and means for applying the resultant signal to the amplification control input of said linear amplifying means in a manner to increase the amplification of the single sideband signal for transmission in accordance with said resultant signal.

2. A single sideband transmission system, comprising:

generating means having an output for producing a single sideband signal substantially without a carrier;

high frequency amplifying means having an input and an output;

linear power amplifying means having an input connected to the output of said high frequency amplifying means, a power supply input for controlling the amplification of said power amplifying means and an output for amplifying a single sideband signal for transmission;

detecting means having an input and an output for detecting a portion of the envelope of the single sideband signal and providing at its output an output signal corresponding to said envelope;

means connecting the output of said generating means to the input of said high frequency amplifying means and to the input of said detecting means;

means for superimposing the output signal of said detector means on a DC signal to provide a resultant signal having an amplitude higher by the level of the DC signal than the amplitude of said output signal; and means for applying the resultant signal to the power supply input of said power amplifying means in a manner to increase the amplification of the single sideband signal for transmission in accordance with said resultant signal.

3. A single sideband transmission system, comprising:
generating means having an output for producing a single sideband signal substantially without a carrier;
high frequency amplifying means having an input and an output;
linear power amplifying means having an input connected to the output of said high frequency amplifying means, a power supply input for controlling the amplification of said power amplifying means and an output for amplifying a single sideband signal for transmission;
detecting means having an input and an output for detecting a portion of the envelope of the single sideband signal and providing at its output an output signal corresponding to said envelope;
means connecting the output of said generating means to the input of said high frequency amplifying means and to the input of said detecting means;
DC power supply means for providing a DC signal;
low frequency amplifying means having an input connected to the output of said detecting means and an output;
means coupling said DC power supply means to the output of said low frequency amplifying means for superimposing the amplified output signal of said detector means on the DC signal provided by said DC power supply means to provide a resultant signal having an amplitude higher by the level of the DC signal than the amplitude of said amplified output signal; and
means for applying the resultant signal to the power supply input of said power amplifying means in a manner to increase the amplification of the single sideband signal for transmission in accordance with said resultant signal.

4. A single sideband transmission system as claimed in claim 3, wherein said power amplifying means includes an output amplifying stage comprising a transistor having emitter, collector and base electrodes and wherein said resultant signal is applied to the collector electrode of said transistor.

5. A single sideband transmission system as claimed in claim 3, wherein said means for superimposing the amplified output signal of said detector on the DC signal provided by said DC power supply means comprises transformer means having a primary winding connected to the output of said low frequency amplifying means and a secondary winding coupled to said DC power supply means.

References Cited

UNITED STATES PATENTS

| | | | |
|---|---|---|---|
| 2,416,831 | 3/1947 | Hings | 325—181 |
| 2,666,133 | 1/1954 | Kahn | 325—137 |
| 2,961,615 | 11/1960 | Barton | 332—41UX |
| 3,277,376 | 10/1966 | Muller | 325—137 |
| 3,284,711 | 11/1966 | Messenger et al. | 325—49X |

ROBERT L. GRIFFIN, Primary Examiner

R. S. BELL, Assistant Examiner

U.S. Cl. X.R.

325—138; 332—45